United States Patent [19]

Yamaguchi

[11] Patent Number: 4,983,874
[45] Date of Patent: Jan. 8, 1991

[54] VIBRATOR AND ULTRASONIC MOTOR EMPLOYING THE SAME

[75] Inventor: Masaki Yamaguchi, Gifu, Japan

[73] Assignee: Brother Kogyo Kabushiki Kaisha, Aichi, Japan

[21] Appl. No.: 375,380

[22] Filed: Jul. 3, 1989

[30] Foreign Application Priority Data

Jul. 5, 1988 [JP] Japan .................... 63-168501

[51] Int. Cl.⁵ ............................. H01L 41/08
[52] U.S. Cl. .................... 310/323; 310/333; 310/358; 310/369
[58] Field of Search ............... 310/323, 328, 333, 358, 310/359

[56] References Cited

U.S. PATENT DOCUMENTS

| | | | |
|---|---|---|---|
| 4,723,085 | 2/1988 | Mukohjima et al. | 310/328 |
| 4,734,610 | 3/1988 | Okumura et al. | 310/328 X |
| 4,829,209 | 5/1989 | Kawasaki et al. | 310/328 X |
| 4,831,305 | 5/1989 | Mukohjima et al. | 310/323 |

FOREIGN PATENT DOCUMENTS

| | | | |
|---|---|---|---|
| 0293977 | 12/1987 | Japan | 310/323 |
| 0031479 | 2/1988 | Japan | 310/323 |
| 0483061 | 10/1980 | U.S.S.R. | 310/332 |

OTHER PUBLICATIONS

Construction of Ultrasonic Motors and their Applications, by Tomikawa et al., Japanese J.A.P. vol. 27 (1988) Supplement 27-1, pp. 195-197.

*Primary Examiner*—Mark O. Budd
*Attorney, Agent, or Firm*—Oliff & Berridge

[57] ABSTRACT

A vibrator for exciting substantially elliptical motion and an ultrasonic motor employing such a vibrator. A vibrator includes a resonant member having a central hole defined therein and a circumferential portion, a first piezoelectric member for exciting circumferential shearing vibration in the resonant member such that the circumferential portion and the hole are positioned at antinodes of the circumferential shearing vibration about the hole, and a second piezoelectric member for exciting vertical vibration or flexural vibration in the resonant member in a direction different from the direction in which the circumferential shearing vibration is excited by the first piezoelectric member. An ultrasonic vibrator has a moving element held against the resonant member in the vibrator.

13 Claims, 4 Drawing Sheets

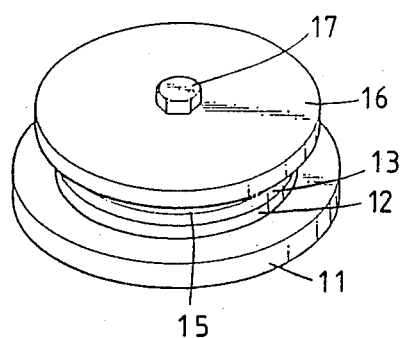
FIG. 1a
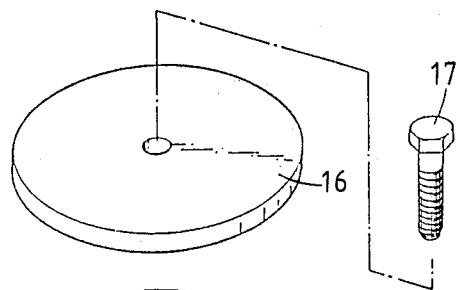
FIG. 1b
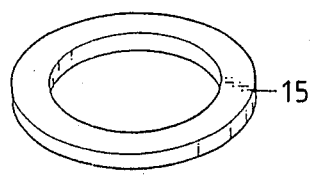
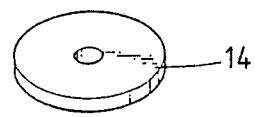
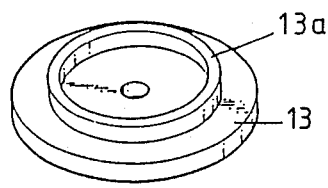
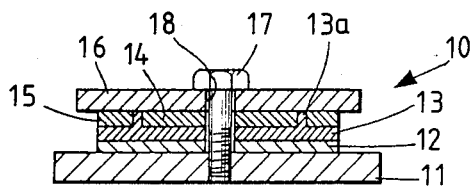
FIG. 1c
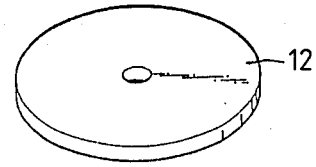
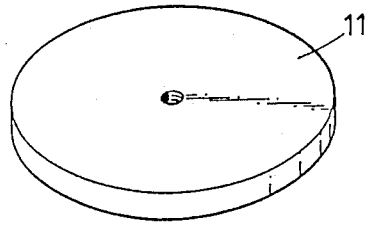

VIBRATOR AND ULTRASONIC MOTOR EMPLOYING THE SAME

BACKGROUND OF THE INVENTION

The present invention relates a vibrator and ultrasonic motor employing the same, and more particularly to a vibrator for exciting substantially elliptical motion and an ultrasonic motor employing such a vibrator.

Ultrasonic motors operate by holding a moving element under a prescribed pressure against a vibrator which excites substantially elliptical motion and driving the moving element under frictional forces between material points which make substantially elliptical motion and moving element. Since a standing-wave-type vibrator is easily constructed to achieve highly efficient vibration, a standing-wave-type ultrasonic motor is higher in efficiency and output than a travelling-wave-type ultrasonic motor.

Vibrators for use in conventional standing-wave-type ultrasonic motors employ a mechanical resonant system having a natural vibration mode which effects unidirectional vibration at the surface of contact with electromechanical transducer and elliptical vibration at the surface of contact with a moving element, so that substantially elliptical motion can be excited highly efficiently. Therefore, there are imposed certain limitations on the configuration and size of the ultrasonic vibrator, and vibrators of desired shape and size cannot be produced. Since the single natural vibration mode is employed, the ratio of the longer to shorter diameters of the substantially elliptical motion that is excited is solely determined by the shape or the like of the vibrator.

The standing-wave-type ultrasonic motor with the above vibrator incorporated can achieve highly efficient operation only in a very limited range. The standing-wave-type ultrasonic motor is poor in its ability to accommodate load fluctuations, cannot be reversed in rotation, and hence has found only a limited range of applications.

There has been an inhouse proposal (Japanese patent Application No. 62-175043) which proposes vibrator which can highly efficiently generate substantially elliptical motion having a large amplitude and can easily control the path of such substantially elliptical motion. The disclosed vibrator produces substantially elliptical motion which is a combination of circumferential shearing vibration and axial flexural vibration which are excited in a planar resonant member.

Circumferential shearing vibration can easily be excited by a method as disclosed in Japanese Laid-Open Patent Publication No. 61-120678, for example.

When circumferential shearing vibration is excited in a planar resonant member, however, since strains are concentrated on the inner circumferential edge thereof, it is difficult to fix the planar resonant member and effect impedance matching, and the boundary conditions tend to become unstable. Therefore, the ultrasonic motor does not operate stably.

According to the above disclosed exciting method, the inner circumferential portion of the planar resonant member cannot strictly be regarded as a fixed end in an ultrasonic range. Therefore, difficulty is experienced in designing an ultrasonic motor using the exciting method.

SUMMARY OF THE INVENTION

In view of the aforesaid defects of the conventional vibrators and ultrasonic motors, it is an object of the present invention to provide a vibrator which can stably excite circumferential shearing vibration and can be designed with ease, and an ultrasonic motor which employs such a vibrator.

According to the present invention, there is provided a vibrator comprising a resonant member having a central hole defined therein and a circumferential portion, first exciting means for exciting circumferential shearing vibration in the resonant member such that the circumferential portion and the hole are positioned at antinodes of the circumferential shearing vibration about the hole, and second exciting means for exciting vertical vibration or flexural vibration in the resonant member in a direction different from the direction in which the circumferential shearing vibration is excited by the first exciting means.

With this structure, an ultrasonic vibrator has a moving element held against the resonant member in the vibrator. The resonant member in the vibrator is caused to excite the vibrations by the first and second exciting means. In the shearing vibration, the resonant member resonates while the circumferential portion and the hole thereof are serving as free ends. The vibrations in the two different directions are combined in the resonant member, producing substantially elliptical vibration.

The moving element in the ultrasonic motor is rotated by frictional forces produced between the moving element and the surface of the resonant member which generates the substantially elliptical vibration.

The above and other objects, features and advantages of the present invention Will become more apparent from the following description when taken in conjunction with the accompanying drawings in Which a preferred embodiment of the present invention is shown by way of illustrative example.

BRIEF DESCRIPTION OF THE DRAWINGS

In the drawings:

FIG. 1(a) is a perspective view of a vibrator according to the present invention;

FIG. 1(b) is an exploded perspective view of the vibrator shown in FIG. 1(a);

FIG. 1(c) is an axial cross-sectional view of the vibrator shown in FIG. 1(a);

DETAILED DESCRIPTION OF THE PREFERRED EMBODIMENTS

Figure 2A:
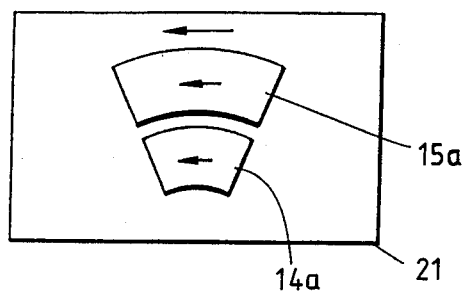
FIGS. 2(a) through 2(c) are views showing a process of manufacturing second and third exciting members.

FIGS. 1(a) through 1(c) show a vibrator, generally denoted at 10, according to the present invention.

Figure 2B:
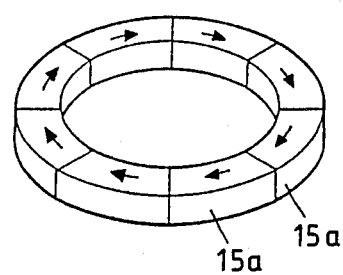
Figure 2C:
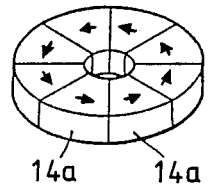

The vibrator 10 includes a first annular piezoelectric member 12 of a thickness mode mounted on the upper surface of a fixed plate 11 The piezoelectric member 12 generates vertical vibration along the thickness thereof in response to an AC voltage applied between electrodes attached to the upper and lower surfaces of the first piezoelectric member 12. A coupler 13 is mounted on the upper surface of the first piezoelectric member 12. The coupler 13 is of the same annular shape as that of the first piezoelectric member 12, and has an annular ridge 13a on its upper surface. The annular ridge 13a is positioned such that it divides the radius of the coupler 13 into substantially equal two segments. Two annular piezoelectric members 14, 15 (referred to as second and third piezoelectric members, respectively) which effect shearing vibration circumferentially are fitted respectively in and over the annular ridge 13a. The second and third piezoelectric members 14, 15 are fabricated as follows:

As shown in FIG. 2(a), segments 14a, 15a are cut out of a piezoelectric plate 21 which has a thickness equal to the height of the annular ridge 13a and is polarized in the direction indicated by the arrow The segment 14a is equal in shape and size to one of eight equal parts of the annular piezoelectric member 14, whereas the segment 15a is equal in shape and size to one of eight equal parts of the annular piezoelectric member 15. Eight segments 15a are prepared and arranged in an annular pattern with their directions of polarization oriented in the same direction, as shown in FIG. 2(b), thus making up the third piezoelectric member 15. Similarly, eight segments 14a are prepared and arranged in an annular pattern with their directions of polarization oriented in the same direction, as shown in FIG. 2(c), thus making up the second piezoelectric member 14. Electrodes are attached to the opposite surfaces of each of the piezoelectric members 14, 15. By applying an AC voltage between these electrodes, the piezoelectric members 14, 15 generate shear vibration in their circumferential direction. The second and third piezoelectric members 14, 15 are fitted in and over the coupler 13 such that their directions of polarization are opposite to each other. The electrodes attached to the upper surfaces and those attached to the lower surfaces of the second and third piezoelectric members 14, 15 are in conductive states.

A circular resonant member 16 larger than the coupler 13 is mounted on the upper surfaces of the second and third piezoelectric members 14, 15. Tho resonant member 16 has a central hole through which it is fastened to the other components of the vibrator 10 by means of a bolt 17. There is a small gap or clearance 18 between the resonant member 16 and the bolt 17 in the radial direction of the resonant member 16. Therefore, the inner circumferential portion of the resonant member 16 can be regarded as a free end (open end) with respect to shearing vibration in an ultrasonic range. The resonant member 16 is in contact with the second piezoelectric member 14, the third piezoelectric member 15, and the annular ridge 13a of the coupler 13. The resonant member 16 resonates at a frequency f with the mode of vertical vibration in the transverse direction thereof, i.e., along the thickness thereof. The resonant member 16 also resonates at the same frequency f with the circumferential shearing vibration. Since the inner and outer circumferential portions of the resonant member 16 are regarded as free ends, they resonate in a mode in which their positions are at the antinodes of the vibration. In general, the natural frequency of shearing vibration represented by the sum of transversal waves propagated on the surface of a planar vibrator does not approximately depend on the thickness of the planar vibrator. The natural frequency of vertical vibration along the thickness of the planar vibrator depends on the thickness of the planar vibrator. Therefore, it is easy to design the resonant member 16 by appropriately selecting the thickness of a circular plate from which the resonant member 16 is made.

Figure 3A:
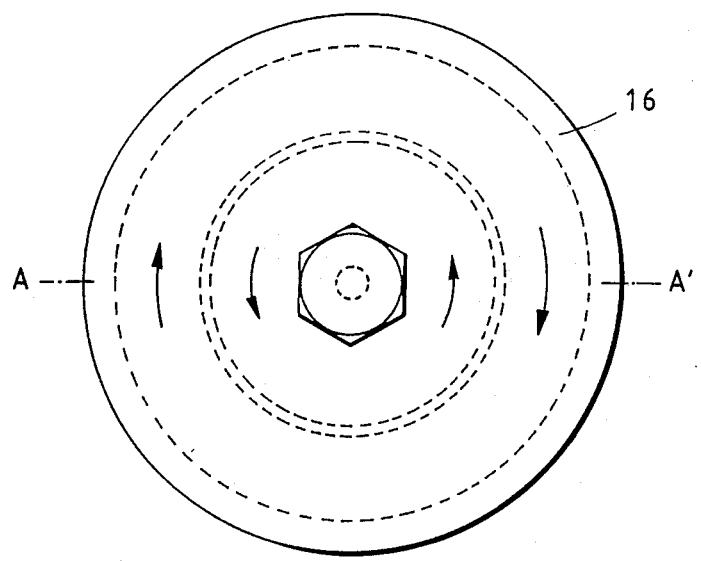
FIG. 3(a) is a plan view of a resonant member, showing the manner in which the resonant member undergoes shearing vibration.
Figure 3B:
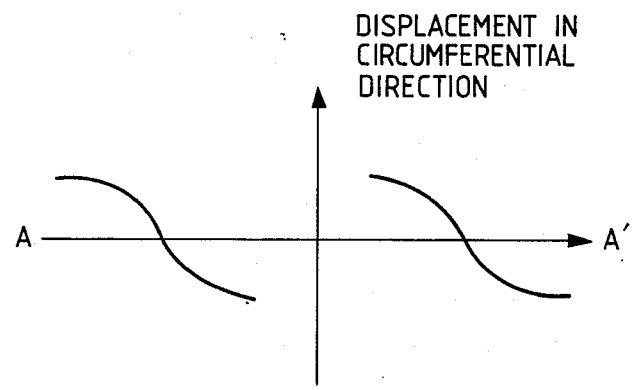
FIG. 3(b) is a diagram showing the maximum displacement of each material point on line A—A' of FIG. 3(a)

The vibrator 10 thus constructed operates as follows:

Excitation of circumferential shearing vibration in the resonant member 16 will first be described. An AC voltage having a frequency f is applied between the electrodes attached to the upper and lower surfaces of the second and third piezoelectric members 14, 15. Inasmuch as the directions of polarization of the second and third piezoelectric members 14, 15 are opposite to each other, the outer and inner circumferential portions of the resonant member 16 which are hold against second and third piezoelectric members 14, 15 are driven in opposite directions to each other. Because the outer and inner circumferential portions of the resonant member 16 are free ends, as described above, their positions are located at the antinodes of the vibration. Therefore, the maximum displacement in the circumferential direction of material points along the radial direction of the resonant member 16 is as shown in FIG. 3(b). The positions where the maximum displacement is zero, i.e., the nodes of the vibration, are at areas of the resonant member 16 which contact coupler 13.

Excitation of vibration in the resonant member 16 in the thickness direction will be described below. When an AC voltage having a frequency f is applied between the electrodes attached to the upper and lower surfaces of the first piezoelectric member 12, the first piezoelectric member 12 vibrates in the thickness direction. This vibration is propagated through the coupler 13 to the resonant member 16. Since the coupler 13 vibrates, at the ridge 13a thereof, the nodes of the shearing vibration of the resonant member 16, the vibration does not adversely affect the excitation of the shearing vibration.

Therefore, the vibration in the thickness direction and the vibration in the circumferential direction are excited in the resonant member 16. If these vibrations are out of phase with each other, then the composite vibrations impart substantially elliptical motion. The user can obtain a desired pattern of substantially elliptical motion by adjusting the phase difference between and the amplitudes of the AC voltage applied between the electrodes on the upper and lower surfaces of the first piezoelectric member 12 and the AC voltage applied between the electrodes on the upper and lower surfaces of the second and third piezoelectric members 14, 15.

Figure 4:
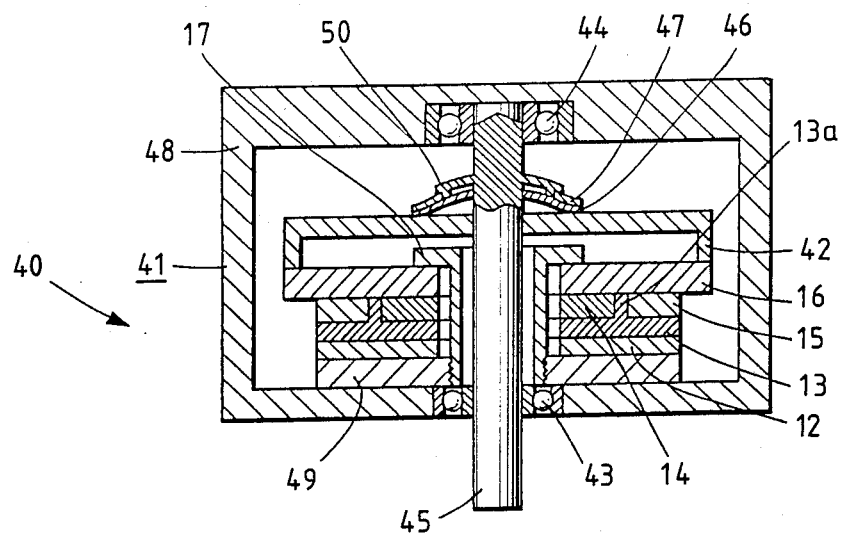
FIG. 4 is an axial cross-sectional view of an ultrasonic motor which employs the vibrator shown in FIGS. 1(a) through 1(c).

An ultrasonic motor which employs the vibrator 10 that excites the above ultrasonic vibration will be described below with reference to FIG. 4. Those parts in FIG. 4 which are denoted by identical reference numerals in FIGS. 1(a) through 1(c) are identical to those components in FIGS. 1(a) through 1(c). In FIG. 4, however, the bolt 17 has an axial central through hole.

An ultrasonic motor 40 has a rotor 42 in the form of a circular plate having a downwardly projecting flange on an outer circumferential edge thereof. The downwardly projecting flange is held against the outer circumferential edge of the resonant member 16. An output shaft 45 which is rotatably supported in a yoke 48 by means of first and second ball bearings 43, 44 extends coaxially through the rotor 42 and also the central hole of the bolt 17. The output shaft 45 has a leaf spring retainer 50 on its upper portion. Between the leaf spring retainer 50 and the rotor 42, there is interposed a leaf spring 47 for normally urging the rotor 42 against the resonant member 16 of the vibrator 10. The vibrator 10 is housed in the yoke 48 and fixed to a base 49 of the yoke 48 by the bolt 17.

When shearing vibration and flexural or vertical vibration are excited in the vibrator 10 to produce substantially elliptical motion on the circumferential edge of the vibrator 10, rotative forces owing to the substantially elliptical motion are transmitted to the rotor 42 which is then rotated about axis of the output shaft 45. As described above, the substantially elliptical motion excited in the vibrator is freely controllable in its path by controlling the AC voltages applied to the second and third piezoelectric members 14, 15 and the first piezoelectric member 12. Therefore, the rotation generated on the rotor 42 can freely be controlled, and various motor parameters such as the direction of rotation, the rotational speed, and the output torque can be adjusted as desired. Accordingly, the ultrasonic motor 40 can be operated highly efficiently in a wide range of load fluctuations or variations.

In the aforesaid embodiment, the piezoelectric members are employed as driving elements for driving the vibrator. However, the principles of the present invention are not limited to the use of piezoelectric members, but other devices capable of converting electric energy to mechanical energy, such as electrostrictive devices, magnetostrictive devices, or the like may be employed as vibrator driving elements. While the ultrasonic vibrator is of a cylindrical shape in the illustrated embodiment, it may be of any of various other shapes insofar as it can excite shearing vibration in the circumferential direction and flexural or vertical vibration in the axial direction.

In the embodiment, the frequency of excitation by the first piezoelectric member and the frequency of resonance of the coupler are different from eaoh other to prevent the coupler from consuming the energy of vibration. While these frequencies ore made different from eaoh other by the different diameters of the resonant member and the coupler, the different frequencies may be achieved by making the resonant member and the coupler of different materials. Since vertical vibration is utilized in the embodiment, the resonant member is uniformly held against the second and third piezoelectric members for stably exciting shearing vibration. If a second exciting means is constructed in another arrangement, shearing vibration can be efficiently excited by using flexural vibration.

With the present invention, as described above, since shearing vibration can stably be excited in the vibrator, the ultrasonic motor employing the vibrator can operate stably. The vibrator can be designed with case since its ends are free ends.

If a higher-order mode of the vibrator is utilized, the effective mass of the vibrator with respect to a space which it occupys may be larger than the effective mass in a lower-order mode, and the energy stored in the resonant member is increased. As a result, the mechanical output of the vibrator is increased, and the effect which is caused on the resonant member by load is reduced.

Although a certain preferred embodiment has been shown and described, it should be understood that many changes and modifications may be made therein without departing from the scope of the appended claims.

What is claimed is:

1. A vibrator comprising:
   a resonant member having a central hole defined therein and a circumferential portion;
   first exciting means for exciting circumferential shearing vibration in said resonant member such that said circumferential portion and said hole are positioned at antinodes of the circumferential shearing vibration about said hole; and
   second exciting means for exciting vertical vibration or flexural vibration in said resonant member in a direction different from the direction in which the circumferential shearing vibration is excited by said first exciting means.

2. A vibrator according to claim 1, wherein said first exciting means comprises a piezoelectric member.

3. A vibrator according to claim 1, wherein said second exciting means comprises a piezoelectric member.

4. A vibrator according to claim 1, wherein said resonant member resonates while said central hole and said circumferential portion serve as free ends.

5. A vibrator according to claim 1, further comprising a coupler through which at least one of said first and second exciting means excites the vibration in said resonant member, said coupler being arranged not to resonate with the frequency of the excited vibration.

6. An ultrasonic motor comprising:
   a vibrator comprising:
      a resonant member having a central hole defined therein and a circumferential portion;
      first exciting means for exciting circumferential shearing vibration in said resonant member such that said circumferential portion and said hole ar positioned at antinodes of the circumferential shearing vibration about said hole;
      second exciting means for exciting vertical vibration or flexural vibration in said resonant member in a direction different from the direction in which the circumferential shearing vibration is excited by said first exciting means; and
   a moving element held against said resonant member in said vibrator.

7. An ultrasonic motor according to claim 6, further comprising a coupler through which at least one of said first and second exciting means excites the vibration in said resonant member, said coupler being arranged not to resonate with the frequency of the excited vibration.

8. The vibrator according to claim 1, wherein said second exciting means vibrates a node of the circumferential shearing vibrator excited in said resonant member, thereby exciting the vertical vibration or flexural vibration in said resonant member.

9. The vibrator according to claim 8, further comprising a coupler having a ridge disposed at a position corresponding to the node, and wherein said second exciting means vibrates said resonant member through said ridge of said coupler.

10. The vibrator according to claim 1, wherein said first exciting means includes an inner vibrator and an outer vibrator disposed concentrically with said holed at the center thereof, and wherein said inner and outer vibrators are oscillated in an opposite phase to excite the circumferential shearing vibration.

11. The vibrator according to claim 10, further comprising a coupler having a ridge disposed at a position corresponding to a node of the circumferential shearing vibration excited in said resonant member, and wherein said second exciting means vibrates said resonant member through said ridge of said coupler.

12. The vibrator according to claim 11, wherein said ridge is disposed between said inner vibrator and said outer vibrator.

13. The vibrator according to claim 11, wherein the inner vibrator and outer vibrator have thicknesses which are substantially equal to the height of said ridge.

* * * * *